(12) United States Patent
Robinson

(10) Patent No.: US 11,008,211 B2
(45) Date of Patent: May 18, 2021

(54) SYSTEM AND METHOD FOR DISTRIBUTING SCENTED, COLOR-CODED, OR COLOR SCENTED DILUTION RATIOS OF DISINFECTANTS, DISINFECTANT BASED CLEANING CONCENTRATES AND READY TO USE FOAMING AND NON FOAMING HARD SURFACE, SOFT SURFACE AND SKIN CLEANING CONCENTRATES THAT ARE DILUTED INTO READY TO USE FORM PRODUCTS

(71) Applicant: Gregory Robinson, Tonawanda, NY (US)

(72) Inventor: Gregory Robinson, Tonawanda, NY (US)

( * ) Notice: Subject to any disclaimer, the term of this patent is extended or adjusted under 35 U.S.C. 154(b) by 0 days.

(21) Appl. No.: 16/554,137

(22) Filed: Aug. 28, 2019

(65) Prior Publication Data
US 2021/0061639 A1 Mar. 4, 2021

(51) Int. Cl.
| | | |
|---|---|---|
| *B67D 7/74* | (2010.01) | |
| *B67D 7/02* | (2010.01) | |
| *C11D 13/08* | (2006.01) | |
| *C11D 13/10* | (2006.01) | |
| *C11D 11/00* | (2006.01) | |

(52) U.S. Cl.
CPC ............ *B67D 7/74* (2013.01); *B67D 7/0288* (2013.01); *C11D 11/0094* (2013.01); *C11D 13/08* (2013.01); *C11D 13/10* (2013.01)

(58) Field of Classification Search
CPC .... B67D 7/74; B67D 7/0288; C11D 11/0094; C11D 13/08; C11D 13/10; B01F 5/043; B01F 5/0413; B01F 2215/0039; B05B 7/04; B05B 7/2443; B05B 7/1209; B05B 7/0408; B05B 7/26; B05B 7/2497; B05B 7/2472
USPC ...... 222/132, 135–136, 144.5, 401; 137/597, 137/888–889; 239/304–305, 307–308, 239/310, 316–318, 407–409, 413–414
See application file for complete search history.

(56) References Cited

U.S. PATENT DOCUMENTS

| | | | | |
|---|---|---|---|---|
| 3,459,334 | A * | 8/1969 | Evans | ..................... B60S 3/044 222/132 |
| 3,756,457 | A * | 9/1973 | Holmes | ............... A47L 15/4427 222/1 |

(Continued)

*Primary Examiner* — Paul R Durand
*Assistant Examiner* — Andrew P Bainbridge
(74) *Attorney, Agent, or Firm* — Vincent G. LoTempio; David T. Stephenson

(57) ABSTRACT

A system and method for distributing color-coded dilution ratios of cleaning concentrates at different dilution ratios and flow rates. The system mixes a concentrated cleaning composition with different quantities of water to produce diluted concentrates. A plurality of separate dyes or scented dyes are added to the diluted concentrates, with each color of dye correlating to a unique diluted concentrate. This provides a visual indication of the dilution ratio of the diluted concentrate. A plurality of metering devices selectively dispense the dyed diluted concentrates at different dilution ratios and at multiple flow rates. The metering devices are labeled with identification markings, indicating dilution ratios and flow rates. The dilution ratio and the flow rate are selected based on the type of cleaning that is required, and the type of dispensing means used for cleaning. A plurality of lines carry the concentrated cleaning composition, water, dyes, and dyed diluted concentrate.

14 Claims, 6 Drawing Sheets

(56) References Cited

U.S. PATENT DOCUMENTS

| | | | |
|---|---|---|---|
| 3,891,149 A * | 6/1975 | Rendemonti | B60S 3/008 239/70 |
| 4,163,523 A | 8/1979 | Vincent | |
| 4,200,206 A * | 4/1980 | Chase | E03C 1/046 137/889 |
| 4,623,095 A * | 11/1986 | Pronk | E03C 1/046 239/311 |
| 4,941,593 A * | 7/1990 | Hicks | B08B 9/0323 134/169 C |
| 4,941,596 A | 7/1990 | Marty | |
| 5,178,091 A * | 1/1993 | Griller | G01F 23/0007 116/1 |
| 5,259,557 A * | 11/1993 | Spriggs | B67D 7/74 222/129 |
| 5,435,157 A * | 7/1995 | Laughlin | D06F 39/022 137/889 |
| 5,460,297 A * | 10/1995 | Shannon | B01F 15/0441 222/135 |
| 5,494,191 A * | 2/1996 | Benson | B05B 9/007 222/189.09 |
| 5,584,327 A * | 12/1996 | Thomas | B01F 13/1055 137/625.11 |
| 6,092,568 A * | 7/2000 | Andersson | B65B 3/326 137/597 |
| 6,227,262 B1 | 5/2001 | Kohl | |
| 6,283,385 B1 * | 9/2001 | Beaver | B05B 7/2443 239/10 |
| 6,322,242 B1 * | 11/2001 | Lang | B01F 13/1055 222/132 |
| 7,032,789 B2 * | 4/2006 | Gabryszewski | B05C 5/0225 222/146.5 |
| 7,093,775 B1 * | 8/2006 | Bingham | B05B 7/2443 139/323 |
| 7,331,488 B2 * | 2/2008 | Naslund | F16K 31/52416 134/100.1 |
| 7,490,737 B2 * | 2/2009 | Cocciadiferro | B29B 7/7663 222/145.5 |
| 7,963,304 B2 * | 6/2011 | Bertucci | B01F 5/08 141/104 |
| 7,997,457 B1 * | 8/2011 | Phillips | B01F 15/042 222/1 |
| 8,631,824 B2 * | 1/2014 | Pelkey | D06F 39/022 137/625.42 |
| 10,672,085 B2 * | 6/2020 | Lyons | A01M 7/0046 |
| 2001/0047309 A1 * | 11/2001 | Bartholomew | G06Q 30/0641 700/233 |
| 2002/0113098 A1 * | 8/2002 | Camacho | B25H 5/00 222/608 |
| 2006/0011746 A1 * | 1/2006 | De Simone | E03C 1/046 239/311 |
| 2011/0278324 A1 * | 11/2011 | Kilian | B67D 7/04 222/135 |
| 2014/0319169 A1 * | 10/2014 | Manicardi | B01F 13/1066 222/1 |
| 2015/0266043 A1 * | 9/2015 | Liu | A45D 34/00 222/135 |

* cited by examiner

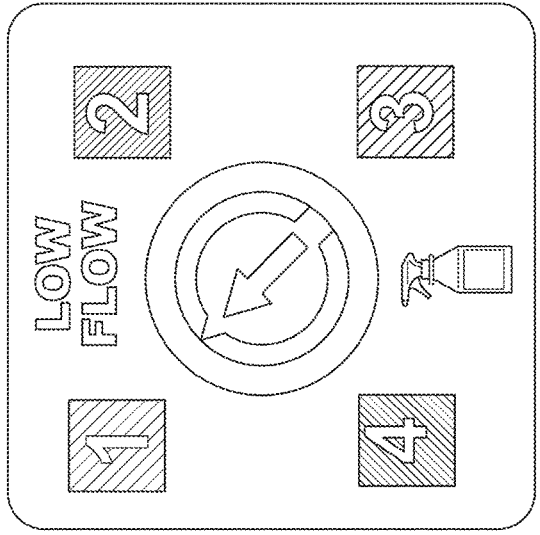
FIG. 6B
FIG. 6D
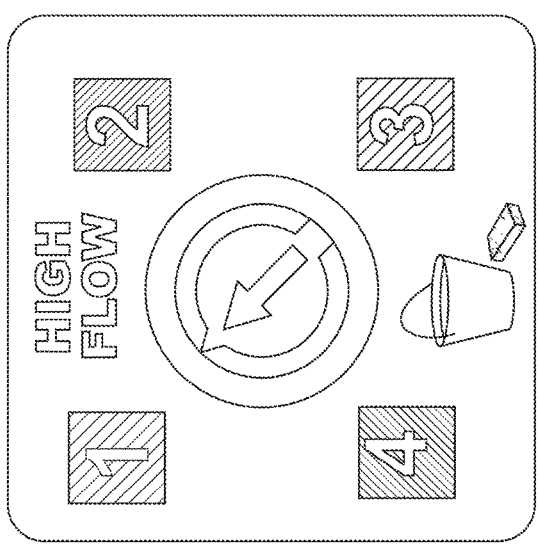
FIG. 6A
FIG. 6C

SYSTEM AND METHOD FOR DISTRIBUTING SCENTED, COLOR-CODED, OR COLOR SCENTED DILUTION RATIOS OF DISINFECTANTS, DISINFECTANT BASED CLEANING CONCENTRATES AND READY TO USE FOAMING AND NON FOAMING HARD SURFACE, SOFT SURFACE AND SKIN CLEANING CONCENTRATES THAT ARE DILUTED INTO READY TO USE FORM PRODUCTS

FIELD OF THE INVENTION

The present invention relates generally to a system and method for diluting and distributing multicolor and or multi scented dilution ratios of cleaning concentrate. More so, the present invention relates to a system and method for distributing a concentrated cleaning composition through a plurality of metering devices in a diluted, color and or scent coded arrangement that enables selection between multiple dilution ratios and flow rates of a concentrated cleaning composition; and further includes dyes added into the diluted concentrations to color-code the diluted concentrations a unique scent, color or scented dye for identification; and further includes multiple metering devices having identification markings that enable facilitated identification and selection of a desired dilution ratio and flow rate.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, manufacturers of cleaning liquids, particularly industrial and consumer cleaning fluids for cleaning work areas, floors, washrooms and the like, generally package their liquid cleaning products in a concentrated form to save expense in storage and transportation, and to conserve storage space until use. Often, the liquid cleaning products are purchased on a concentrated basis, and then are diluted to the proper strength at the site where they will be used. This type of general system is employed by a wide variety of users, e.g., hotels, hospitals, restaurants, etc.

It is known in the art that numerous dispensing systems have been developed for diluting a concentrated cleaning product. The dispensers usually feature at least some of the following components: a container for the concentrated cleaning product, an intermediate-sized storage container for the diluted cleaning product, a method to dose concentrate into the storage container, and a water supply line to dilute the concentrate.

Unfortunately, using too much concentrated liquid cleaner is wasteful, unnecessary, and expensive. Over-use of these products also hampers thorough rinsing and leaves messy residues. On the other hand, utilization of too little cleaning concentrate in the use solution will not clean adequately, causing the user to repeat the procedure again, involving yet more costly labor.

Other proposals have involved dispensing a concentrated cleaning composition in diluted form. Also, the dispensing flow rates are not adjustable to need. Even though the above cited cleaning composition dispensing systems meet some of the needs of the market, a system and method for distributing a concentrated cleaning composition through a plurality of metering devices in a diluted, scent, color or scented dye/color coded arrangement that enables selection between multiple dilution ratios and flow rates of a concentrated cleaning composition; further including up to 4 colored dyes added into the diluted concentrations to color-code the diluted concentrations up to 4 unique colors and or up to 4 unique scented colors or up to 4 scents alone for identification; and further includes multiple metering devices having identification markings that enable facilitated identification and selection of a desired dilution ratio and flow rate, was desired until now.

SUMMARY

Illustrative embodiments of the disclosure are generally directed to a system and method for distributing scented (or unscented), color-coded or scented dye dilution ratios of hard surface, soft surface or skin cleaning concentrates at different dilution ratios and flow rates. The system and method mixes a concentrated cleaning composition with different quantities of water to produce a plurality of diluted concentrates. A plurality of dyes and scents are added to the diluted concentrate, with each color of dye and or scent correlating to a unique diluted concentrate. This provides a visual and or olfactoral indication of the product at the dilution ratio of the diluted concentrate, with each different dilution ratio being defined by a unique dye color, color/scent or scent alone.

A plurality of lines carry concentrate to a plurality of metering devices that selectively dilute the finished, selection strength.

A dyed diluted concentrate at different dilution ratios and at multiple flow rates. The dilution ratio and the flow rate are selected based on the type of cleaning that is required, and the type of dispensing means used for cleaning. A plurality of lines carry the concentrated cleaning composition, water, with 0 up to 4 separate dyes and or 0 and up to 4 separate scented dyes and or up to 4 separate scents of the diluted concentrate.

In some embodiments, the concentrated cleaning composition may be stored in a concentrate container. A concentrate outlet line carries the concentrated cleaning composition out of the concentrate container for dilution, color-coding, and possible scent selective distribution. A water inlet line is in fluid communication with the concentrate container and the concentrate outlet lines. The water inlet line is in the dispenser itself, and supplies water in different quantities from a water source. The water from the water inlet line mixes with the concentrated cleaning composition in the concentrate outlet lines. The mixture of concentrated cleaning composition to water is proportioned into a plurality of diluted concentrates having different dilution ratios. The different diluted concentrates are utilized for different cleaning applications. For example, a concentrated dilution ratio cleans an outdoor patio, while a diluted concentrate is used for cleaning a table.

A plurality of up to 4 separate dye containers and or up to 4 separate scented dyes and or up to 4 separate scented containers of scents, dye, or scented dye contain and are heretofore noted as "solutions" These solutions are in fluid communication with the concentrated cleaning composition. Each solution is defined by a unique color and or scent correlating to a dilution ratio of a diluted concentrate. A plurality of solution lines are in fluid communication with the solution lines carrying the specific solutions. The up to 4 separate solution lines dispense multiple up to 4 separate dyes and or up to 4 separate scented dyes and or up to 4 separate scents into the different diluted ready to use products, with each color of up to 4 separate dyes and or up to 4 separate scented dyes and or up to 4 separate scents correlating to a unique diluted ready to use product. For example, a blue dye may correlate to a diluted concentrate; and a green dye may correlate to a more concentrated dilution ratio of diluted concentrate which may or may not add a scent or a color.

A plurality of up to 4 separate dispensing lines are in fluid communication with the up to 4 separate dyes and or up to 4 separate scented dyes and or up to 4 separate scents lines for carrying the dyed diluted concentrates to be dispensed. A plurality of metering devices are in fluid communication with the dispensing lines. The metering devices selectively dispense up to 4 separate dyes and or up to 4 separate scented dyes and or up to 4 separate scents diluted concentrates at the different dilution ratios and at the multiple flow rates. Each flow rate of up to 4 separate dyes and or up to 4 separate scented dyes and or up to 4 separate scents diluted concentrates fills a specific variation and size of dispensing containers, i.e. low flow rate for spray bottles, and high flow rate for mop buckets, or other large cleaning containers. The metering devices comprise alphanumeric or color-coding identification markings as visual indicators for identification and selection of the dilution ratios and flow rates of the up to 4 separate dyes and or up to 4 separate scented dyes and or up to 4 separate scents diluted concentrates.

In another aspect, the concentrated cleaning composition can include at least one of the following: a soap, a detergent, a degreaser, ammonia, citric acid, either potassium and/or sodium hydroxide, a hypochlorite, a quaternary, a solvent, an amine and a surfactant.

In another aspect, the concentrate container comprises a multi-collapsible bladder package that collapses as the concentrated cleaning composition is dispensed.

In another aspect, the concentrate container comprises a sidewall forming an interior volume and a container opening regulating access to the interior volume.

In another aspect, the concentrate container comprises an interior tube being in fluid communication with the interior volume of the concentrate container and the concentrate outlet lines.

In another aspect, the system further comprises a plurality of fittings engineered to join the lines.

In another aspect, the fittings comprise barbed nozzles.

In another aspect, the fittings comprises T-shaped fittings.

In another aspect, the system further comprises a line bracket defined by a plurality of holes disposed in a linear, spaced relationship.

In another aspect, the holes in the line bracket enable passage of the dispensing lines.

In another aspect, the metering devices comprise alphanumeric or color-coding identification markings.

In another aspect, the identification markings form a visual indicator the dilution ratios and the flow rates of the up to 4 separate dyes and or up to 4 separate scented dyes and or up to 4 separate scents diluted concentrate.

In another aspect, the flow rates comprise a high flow rate and a low flow rate.

In another aspect, the system comprises a housing, the housing receiving and segregating the concentrate container and the up to 4 separate dyes and or up to 4 separate scented dyes and or up to 4 separate scents containers.

In another aspect, the system further comprises an aspirator and a vacuum for regulating the amount of water mixing with the concentrated cleaning composition.

In one aspect, a method for distributing color-coded dilution ratios of cleaning concentrates, comprises:
containing a concentrated cleaning composition in a concentrate container;
carrying the concentrated cleaning composition from the concentrate container;
mixing different ratios of water with the concentrated cleaning composition, whereby the mixture of concentrated cleaning composition and water produces a plurality of diluted ready to use products having a plurality of dilution ratios and a plurality of applications;
carrying the diluted concentrate through a plurality of diluted concentrate lines;
providing a plurality of up to 4 separate dyes and or up to 4 separate scented dyes and or up to 4 separate scents containers containing a plurality of dyes, the dyes being in fluid communication with the diluted concentrate lines, each dye having a unique color that correlates to a dilution ratio;
dispensing the up to 4 separate dyes and or up to 4 separate scented dyes and or up to 4 separate scents into the diluted concentrate through a plurality of dye lines to form a plurality of dyed diluted ready to use products;
carrying the up to 4 separate dyed and or up to 4 separate scented dyed and or up to 4 separate scented concentrate through a plurality of dispensing lines for dispensing to dilution port points;
selectively dispensing the dyed diluted concentrate at the different dilution ratios and at the multiple flow rates with a plurality of metering devices.

One objective of the present invention is to color code the concentrate being dispensed with variously colored dyes and scents, so as to enable visual identification of the different application dilution ratios during dispensing.

Another objective is to enable selective distribution of the up to 4 separate dyed or scented dye diluted concentrate at a low flow rate and a high flow rate.

Yet another objective is to provide different colors of up to 4 separate dyes and or up to 4 separate scented dyes and or up to 4 separate scents that correlate to different dilution ratios.

Yet another objective is to provide metering devices that enable easy, manual diluting/dispensing of the up to 4 separate dyed and or up to 4 separate scented dyed and or up to 4 separate scented diluted concentrate with water Yet another objective is to enable facilitated assembling and disassembling of the various lines with barbed fittings.

Yet another objective is to organize the dispensing lines with a line bracket.

Yet another objective is to provide a system for distributing color-coded dilution ratios of cleaning concentrate that is easy to operate.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings, including up to 4 different colors and up to 4 different scents and up to 4 different concentrate systems.

BRIEF DESCRIPTION OF THE DRAWINGS

The invention will now be described, by way of example, with reference to the accompanying drawings, in which:

FIGS. 6A-6D illustrate a top view of identification markings, where FIG. 6A shows a first identification marking that identifies the dial settings for different concentrated dilution ratios at a high flow rate, FIG. 6B shows a dial at a second identification marking, FIG. 6C a third identification marking that identifies the dial settings for different concentrated dilution ratios at a low flow rate, and FIG. 6D shows a dial at a fourth identification marking.

Like reference numerals refer to like parts throughout the various views of the drawings.

DETAILED DESCRIPTION OF THE INVENTION

Figure 1:
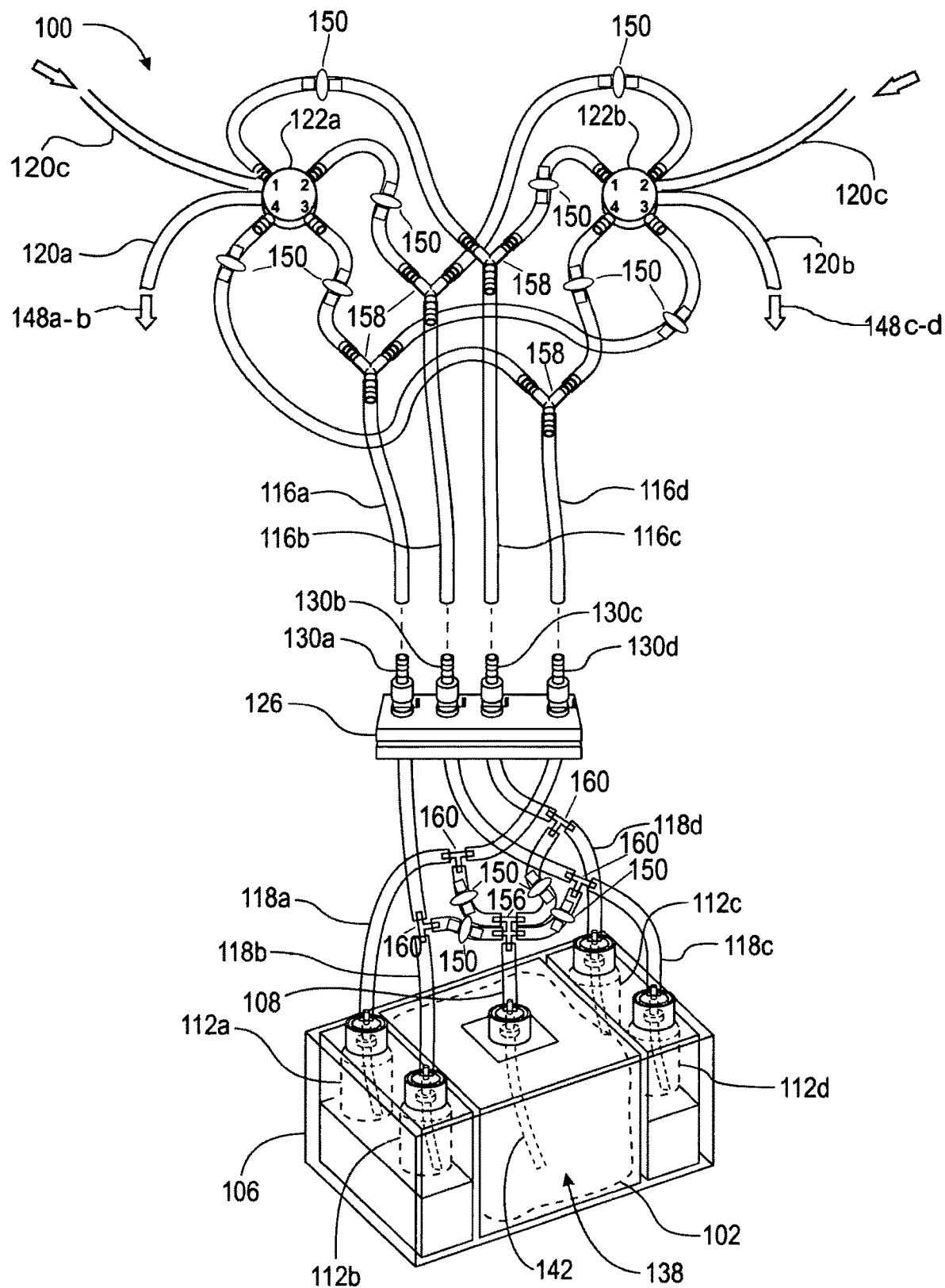
FIG. 1 illustrates a perspective view of an exemplary system for distributing color-coded dilution ratios of cleaning concentrate, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A system 100 and method 200 for distributing color-coded dilution ratios of cleaning concentrates is referenced in FIGS. 1-7. System 100 is configured to mix a concentrated cleaning composition 138 with different quantities of water to produce a plurality of diluted application products 146a-d. A plurality of up to 4 separate dyes and or up to 4 separate scented dyes and or up to 4 separate scents. 114a-d are added to diluted concentrates 146a-d, with each color of up to 4 separate dyes and or up to 4 separate scented dyes and or up to 4 separate scents correlating to a unique diluted concentrate 146a-d. Dyes 114a-d provides a visual indication of the dilution ratio of diluted concentrate 146a-d, with each different dilution ratio being defined by a unique dye color. System 100 is configured as a collapsible bladder system utilizing multi-scented and dye arrangements that could be expanded up to 4 separate bladders and dye and or dyed scent configurations.

In some embodiments, a plurality of metering devices 122a, 122b selectively dispense the up to 4 separate dyed and or up to 4 separate scented dyes and or up to 4 separate scented diluted concentrate 148a-d at different dilution ratios and at multiple flow rates. Metering devices 122a-b are labeled with identification markings, indicating dilution ratios and flow rates. The dilution ratio and the flow rate are selected based on the type of cleaning that is required (light, heavy duty), and the type of dispensing means used for cleaning (spray bottle, mop bucket).

As referenced in FIG. 1, a plurality of dispensing lines 120a, 120b are utilized to carry the concentrated cleaning composition 138, water, dyes 114a-d, up to 4 separate dyes, up to 4 separate scented dyes, and up to 4 separate scents diluted concentrate 148a, 148b, 148c, 148d. Dispensing lines 120a-b are configured to dispense the concentrated cleaning composition so that a mop bucket or spray bottle can be easily filled without requiring activation of a water supply.

In some embodiments, at least one backflow protector 150 integrates into the dispensing lines 120a-b. The backflow protector 150 helps maintain flow in one direction, thereby preventing undesirable backflow of water and/or dyes. In one non-limiting embodiment, the backflow protector 150 comprises a simple check valve that allows flow in one direction and automatically prevents back flow (reverse flow) when fluid in the line reverses direction.

In some embodiments, concentrated cleaning composition 138 may be stored in a concentrate container 102. Concentrate container 102 comprises a sidewall 136 forming an interior volume 138 and a container opening 140 regulating access to interior volume 138. In one non-limiting embodiment, concentrate container 102 is a collapsible bladder package that collapses as the concentrated cleaning composition 138 is dispensed. Bladder-type and semi-rigid containers are described; though flexible bags could be substituted. In yet another possible embodiment, concentrate container 102 may be approximately one to five gallons in size; or a 1 pint to 1 gallon consumer version.

In some embodiments, concentrate container 102 dispenses the contained cleaning composition 138 while positioned in an elevated surface, on the floor, or on a moving cart. Though, it is not necessary that concentrate container 102 be placed on an elevated support member for gravity-induced dispensing of concentrated cleaning composition 138. Concentrate container 102 could be supported on a floor.

Examples of the types of concentrated cleaning compositions contained in the concentrate container 102 may include: multi-purpose cleaners, e.g., for walls, windows, tile and hard surfaces; germicidal detergents for disinfecting and sanitizing; floor care products; and specialty products for special cleaning needs. Other concentrated cleaning compositions may include, without limitation, a soap, a detergent, a degreaser, ammonia, citric acid, sodium hydroxide, and or potassium hydroxide. However, it is to be understood that the present invention is not to be limited for use only with cleaning products, but can be utilized to store and dispense any type of solution. Further, liquids other than concentrates may also be utilized consistent with the invention.

A concentrate outlet line 108 carries the concentrated cleaning composition 104 out of the concentrate container 102 for dilution, color-coding, and selective distribution. In one non-limiting embodiment, an interior tube 142 is in fluid communication with the interior volume 138 of the concentrate container 102 and the concentrate outlet line 108. Interior tube 142 is coupled to the concentrate outlet line 108 for carrying concentrated cleaning composition 138 out of the interior volume 138 of concentrate container 102.

Concentrate container 102 and concentrate outlet line 108 receive water in different quantities. Municipal and secondary pressurized water is introduced into each created solution. Water is supplied in different quantities from a water source. The water mixes with the concentrated cleaning composition 138 flowing through concentrate outlet line 108. The mixture of concentrated cleaning composition 138 to water is proportioned into a plurality of diluted concentrates 146a-d having possible different dilution ratios, different colors and possible different scents.

The different diluted concentrates 146a-d are used to address different cleaning applications. For example, one cleaning application might require a 1% solution, whereas another cleaning application may require a 10% solution of the same cleaning composition. Alternatively, an adjustable metering accessory may be utilized to enable the proportion ratio to be adjusted. For example, a concentrated dilution ratio cleans an outdoor patio, while a watered down concentrate is used for cleaning a table.

Figure 4:
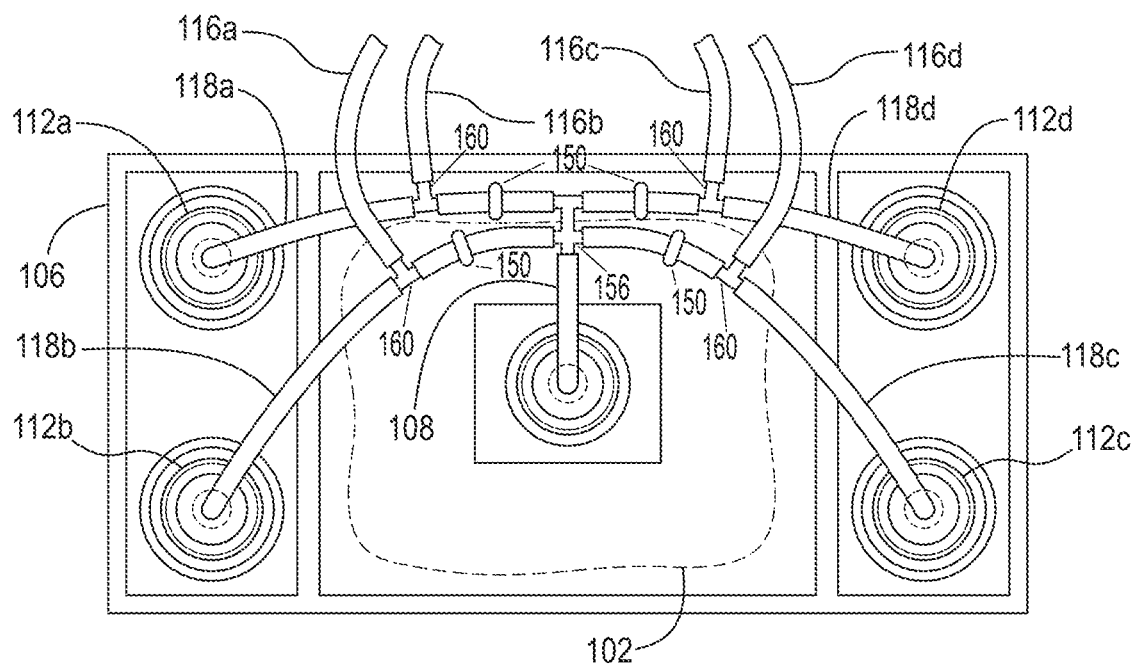
FIG. 4 illustrates a top view of the concentrate container dispensing a concentrated cleaning compositions and dye containers dispensing up to 4 separate dyes and or up to 4 separate scented dyes and or up to 4 separate scents, in accordance with an embodiment of the present invention.

In another exemplary application, clear or dyed concentrate is diluted with up to 4 scents, covering the plurality of dilutions making up the plurality of applications clear, yet scented As FIG. 4 shows, a plurality of up to 4 separate dyes and or up to 4 separate scented dyes and or up to 4 separate scents containers 112a-d contain a plurality of up to 4 separate dyes and or up to 4 separate scented dyes and or up to 4 separate scents 114a-d. Dyes 114a-d are in fluid communication with the concentrate lines 116a-d. Each dye 114a-d is defined by a unique color that correlates to a dilution ratio of a diluted concentrate 146a-d. Further, a plurality of up to 4 separate dyes and or up to 4 separate scented dyes and or up to 4 separate scents lines 118a-d are in fluid communication with the up to 4 separate dyes and or up to 4 separate scented dyes and or up to 4 separate scents 114a-d, with the up to 4 separate dyes and or up to 4 separate scented dyes and or up to 4 separate scents lines 118a-d carrying the dyes 114a-d from the up to 4 separate dyes and or up to 4 separate scented dyes and or up to 4 separate scents containers 112a-d to diluted concentrate lines 116a-d. up to 4 separate dyes and or up to 4 separate scented dyes and or up to 4 separate scents lines 118a, 118b, 118c, 118d are arranged to dispense up to 4 separate dyes and or up to 4 separate scented dyes and or up to 4 separate scents 114a-d into the different diluted concentrates 146a-d, with each color of up to 4 separate dyes and or up to 4 separate scented dyes and or up to 4 separate scents correlating to a unique diluted concentrate 146a-d.

Figure 2:
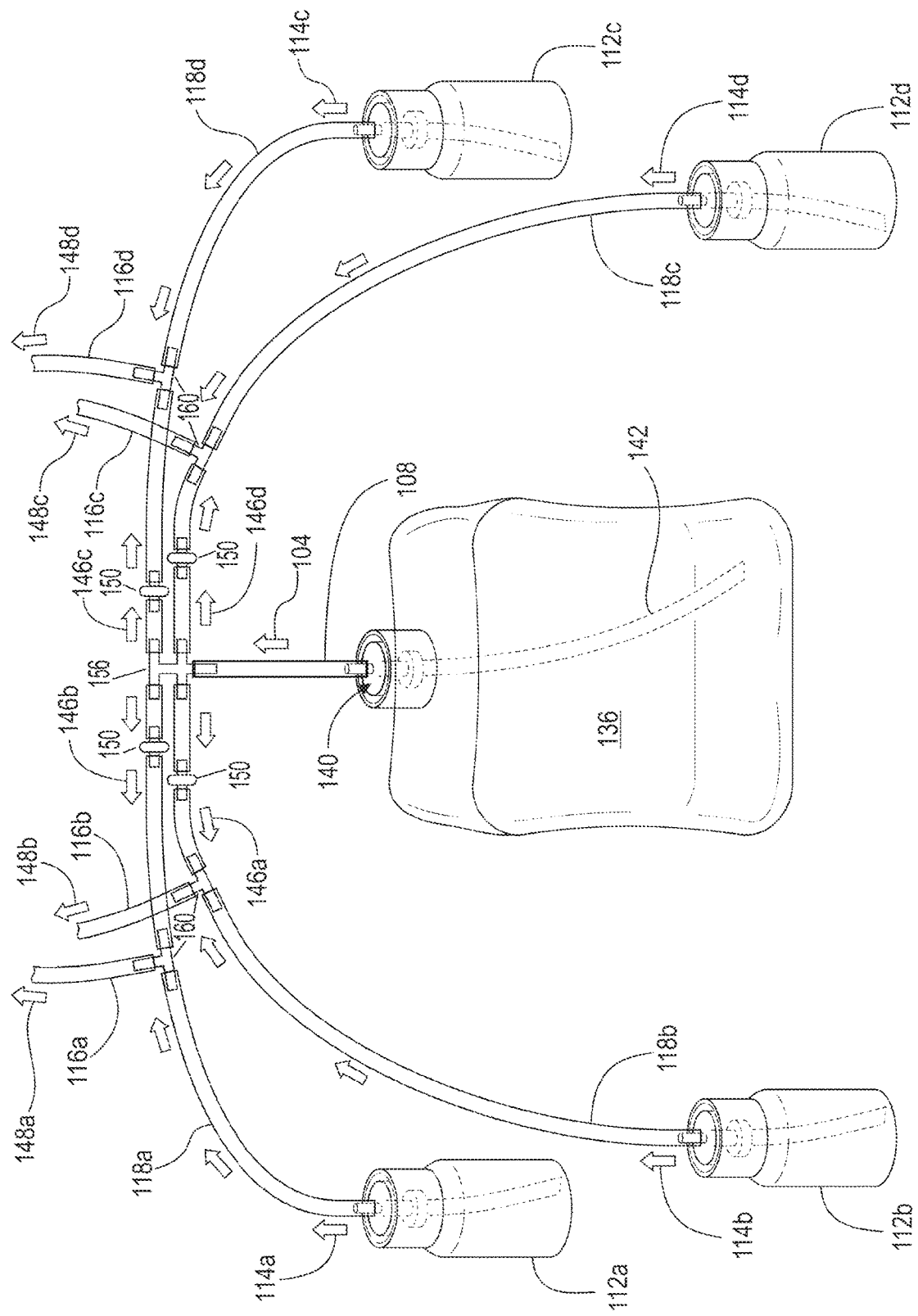
FIG. 2 illustrates a perspective view of an exemplary concentrate container dispensing a concentrated cleaning composition, an exemplary water inlet dispensing water to dilute the concentrated cleaning composition, and an exemplary plurality of dye containers dispensing dyes for color-coding the diluted concentrates, in accordance with an embodiment of the present invention.

For example, FIG. 2 illustrates a perspective view of an exemplary concentrate container 102 dispensing a concentrated cleaning composition 138; and exemplary dye containers 112a-d dispensing dyes 114a-d that color-code the diluted concentrates 146a-d.

Thus, by color coding the diluted concentrates 146a-d while they are being dispensed with up to 4 separate variously colored dyes or scented dyes or scents 114a-d, visual identification of the different dilution ratios is possible. For example, a blue dye 114a correlates to a watered down diluted concentrate 146a, often used for lighter cleaning tasks; a red dye 114b correlates to a less diluted concentrate 146b; a purple dye 114c correlates to a more concentrated diluted concentrate 146c; and a green dye 114d correlates to a concentrated dilution ratio of diluted concentrate 146d, often used for more heavy duty/industrial cleaning tasks.

In one non-limiting embodiment, a plurality of dispensing lines 120a-b are in fluid communication with the up to 4 separate dyes and or up to 4 separate scented dyes and or up to 4 separate scents lines 118a-d for carrying the up to 4 separate dyes and or up to 4 separate scented dyes and or up to 4 separate scents diluted concentrate 148a-d to be dispensed. Dispensing lines 120a-b are configured to dispense the concentrated cleaning composition so that a mop bucket or spray bottle can be easily filled without requiring activation of a water supply. In one non-limiting embodiment, dispensing lines 120a-b comprise a valve and control handle for activating discharge of the diluted concentrate 146a-d. In one embodiment of high flow rate, the diluted concentrate 146a-d is dispensed at a rate of approximately two gallons per minute.

Figure 3:
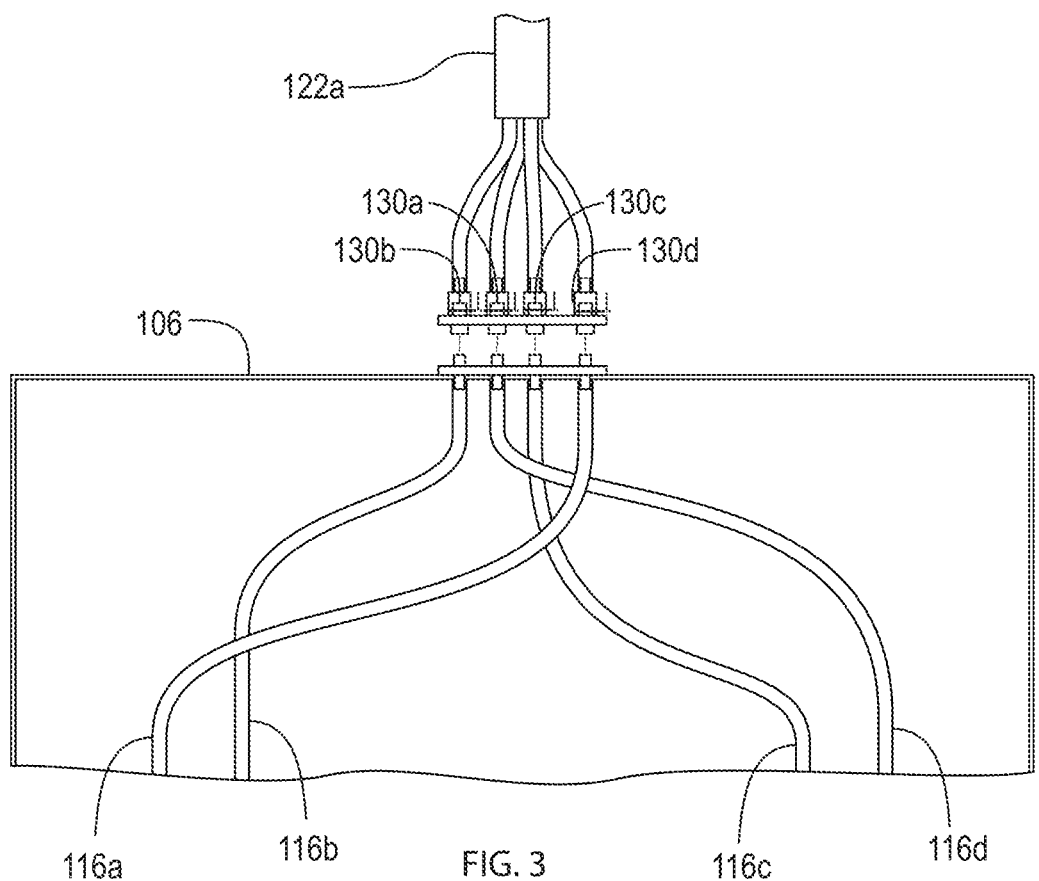
FIG. 3 illustrates a side view of an exemplary diluted concentration lines passing through a line bracket, in accordance with an embodiment of the present invention.

In one non-limiting embodiment, system 100 provides a line bracket 126 to help organize the dispensing lines 120a-b. FIG. 3 illustrates a side view of an exemplary diluted concentration lines passing through a line bracket. Line bracket 126 may include an elongated panel defined by a plurality of holes 128a-d disposed in a linear, spaced-apart relationship. Holes 128a-d that form in line bracket 126 enable passage of dispensing lines 120a-b, so as to organize and segregate the different diluted concentrates 146a, 146b, 146c. Holes 128a, 128b, 128c, 128d are shaped and dimensioned to form a snug fit around the dispensing lines 120a-b.

Figure 5:
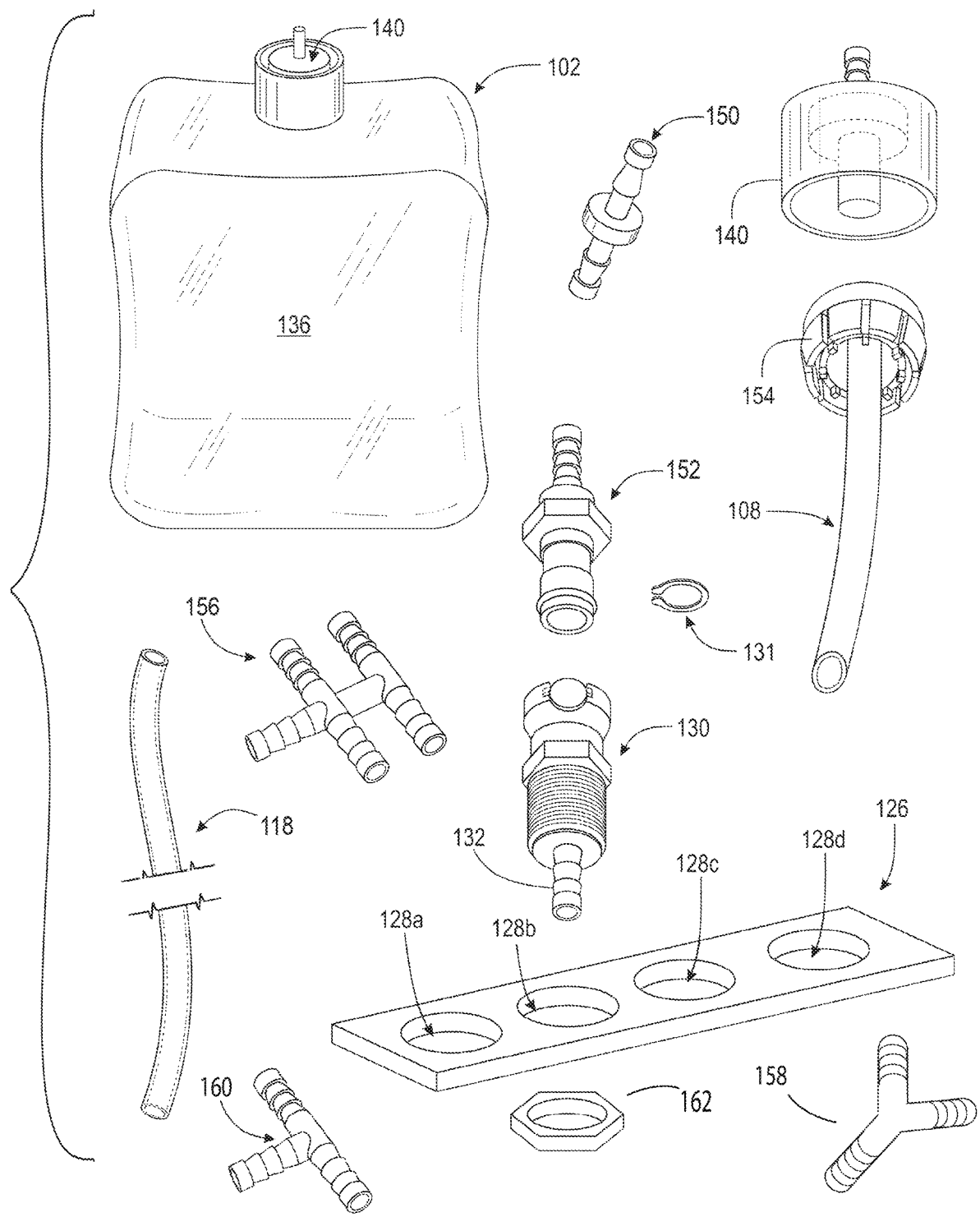
FIG. 5 illustrates a perspective view of an exemplary concentrate container, fittings, line bracket, and water inlet line, in accordance with an embodiment of the present invention.

Looking now at FIG. 5, a plurality of fittings 130a-d are utilized to couple the ends of the lines 108, 110, 116a-d, 118a-d, 120a-b together, including: the interior tube 142, the concentrate outlet line 108, a water inlet line, the concentrate lines 116a-d, the dye lines 118a-d, and the dispensing lines 120a, 120b. Fittings 130a-d may be tapered and barbed, forming a barbed nozzle 132 that enables quick attachment and detachment of the different lines. In this manner, the lines can be interchanged to adjust lengths if needed then gets diluted, but not before.

The quick connect lines and barbed fitting assembly requires no plumbing hook-up, and can be used at any sink or faucet. For example, a dye line 118a can be removed and replaced with a longer dye line 118b, or with a dispensing line 120a. In one non-limiting embodiment, fittings 130a-d include barbed nozzles that form a generally tapered configuration. In another non-limiting embodiment, the fitting is a T-shaped fitting 160 that allows any of the above mentioned lines 108, 110, 116a-d, 118a-d, 120a-b to connect simultaneously. In another non-limiting embodiment, the fitting is a cap 160 that fits onto the container opening of the concentrate container 102. A threaded cap nut 154b that has a coupling relationship with cap 154a notably couples and decouples to cap 154a to help in dispensing concentrated cleaning composition 104 from container 102.

In one example of the possible different types of fitting, FIG. 5 illustrates a first fitting that is part of the end of cap 154; a second fitting 130b having two similar ends; a third fitting 130c having a wide threaded end and a narrow barbed end; and a fourth fitting 130d having an end that is threaded and barbed. Though in other alternative configurations, the fittings may be configured in a snap-fit configuration, a threaded configuration, or a welded configuration. In yet another embodiment, a snap ring 131 may be used to hold the third fitting in place.

In one non-limiting embodiment, system 100 comprises a housing 106 that receives and segregates the concentrate container 102 and the dye containers 112a, 112b, 112c, 112d. Housing 106 may have rigid, or semi-rigid walls that are lightweight, so as to facilitate mobility of system 100. In one non-limiting embodiment, housing 106, containers 102, 112a-d, and lines 108, 116a-d, 118a-d, 120a-b are supported by a transportable cart assembly so that it is readily portable. Housing 106 is portable enough to be set up in various locations. Because the sizes of the various containers inside the housing 106 are relatively small, system 100 is modular, and can be set up close to the point of usage, thereby saving time and effort for janitorial personnel.

As referenced in FIG. 1, a plurality of metering devices 122a, 122b are in fluid communication with the dispensing lines 120a, 120b. Metering devices 122a-b selectively dispense the dyed diluted concentrates 148a-d at the different dilution ratios and at the multiple flow rates. Metering devices 122a-b deliver the dyed diluted concentrate 148a-d in exact use of dilution ratios to assure that the proper dilution ratio is set. Those skilled in the art will recognize that this obviates the tendency of janitorial personnel to over-use the product. In this manner, the use of concentrated cleaning composition 138 can be controlled to the precise number of ounces per gallon or parts per million required. This accurate dispensing eliminates product over-use, waste and spilling, as opposed to separate gallons of concentrate and or ready-to-use being dispensed and or many more separate smaller quart and pint bottles of ready-to-use products so very popular today.

The flow rates of dyed added inline concentrate 148a-d dispensing from the dispensing lines 120a, 120b include a high flow rate and a low flow rate. Each flow rate of dyed diluted concentrate 148a-d fills a specific variation and size of dispensing containers, i.e. low flow rate for spray bottles, and high flow rate for buckets. In one non-limiting embodiment, a high flow rate (4 gpm or greater) delivers a ready to use cleaning composition 138, such as when filling a bucket or an auto-scrubber. A low flow rate (2 gpm or less) is used when filling spray bottles. In another non-limiting embodiment, one dispensing line carries sufficient volume for a low flat rate, and two dispensing lines 120a-b carry sufficient volume for a high flow rate.

As illustrated in FIGS. 6A-6D, metering devices 122a-b comprise of digital, alphanumeric or color-coding identification markings 124a-d that serve as visual indicators for identification and selection of both the dilution ratios and the flow rate of dyed diluted concentrate 148a-d. Identification markings 124a-d form a visual indicator the dilution ratios and the flow rates of the dyed diluted concentrate 148a-d. In this manner, metering devices 122a-b enable easy, manual dispensing of the dyed diluted concentrate 148a-d. It should be appreciated different adaptations of metering devices can be employed with various configurations of apertures, labels, and flow patterns, depending on the desired flow rate. The apertures of the metering devices are dilution port points that are selectively opened by a valve and control handle for activating discharge of the diluted concentrate as described above. Water is introduced into metering devices 122a-b through water lines 120c at a constant pressure of about a minimum of 40 psi. One skilled in the art should understand that when an aperture of the metering devices is selectively opened the water pressure creates a flow rate by suction or aspiration between dyes/scent container and the concentrate container dependent upon aperture size of the line that coincides with the metering device's alphanumeric or color-coding identification marking selected (i.e. dilution ratios and flow rates at a high flow 5 gallons of diluted/colored/scented product per minute or a low flow rate of 1 gallon product per minute of diluted/colored/scented depending on numeric value selected). Only one aperture of the metering devices is selectively opened at a time as the metering devices cannot work simultaneously.

In one non-limiting embodiment, dispensing lines 120a-b may also be color-coded to correspond with the particular scented, colored or scented color concentrate 146a-d being utilized. There are also appropriate labels on housing 106, concentrate container 102, and dye containers 112a-d that help in identifying the name of the concentrated cleaning composition 104, the dilution ratio, and the flow rate of dyed diluted concentrates 148a-d that are being dispensed. This minimizes the chance of contamination and minimizes the likelihood that a particular cleaning product will be used at an improper dilution ratio. Identification markings 124a-d also results in a cost savings for the user, in that wastage of the cleaning product is eliminated when the proper dilution ratio is maintained.

Looking at FIG. 6A, identification markings 124a-d comprises a first identification marking 124a that identifies the dial settings for different concentrated dilution ratios flowing at a high flow rate. The high flow rate is effective for filling a bucket, and may include a concentrated dilution ratio for providing: a hood wash cleaning composition, a light duty scrubbing cleaning composition, an office wall partition cleaning composition, a manual floor cleaning composition, a carpet cleaning composition, and a heavy duty scrubbing/stripping cleaning composition. A user can select the desired dilution ratio based on first identification marking 124a. Further, as shown in FIG. 6C, the high flow rate can be adjusted by manipulating a dial at a second identification marking 124c. This enables selective control of the flow rates.

FIG. 6B shows that identification markings 124a-d comprise a third identification marking 124b that identifies the dial settings for different concentrated dilution ratios flowing at a low flow rate. The low flow rate is effective for filling a spray bottle, and may include a concentrated dilution ratio for providing: a window cleaning composition, a chalkboard cleaning composition, a table top cleaning composition, a shower scum cleaning composition, a clothes spot remover cleaning composition, and a carpet and upholstery cleaning composition. A user can select the desired dilution ratio based on third identification marking 124b. Further, as shown in FIG. 6C, the low flow rate can be adjusted by manipulating a dial at a fourth identification marking 124d. This enables selective control of the flow rates. FIG. 6D shows a dial at a fourth identification marking and with possible fourth identification can be made with all low flow (not shown) and or a fifth possible identification can be all high flow formats (not shown).

Figure 7:
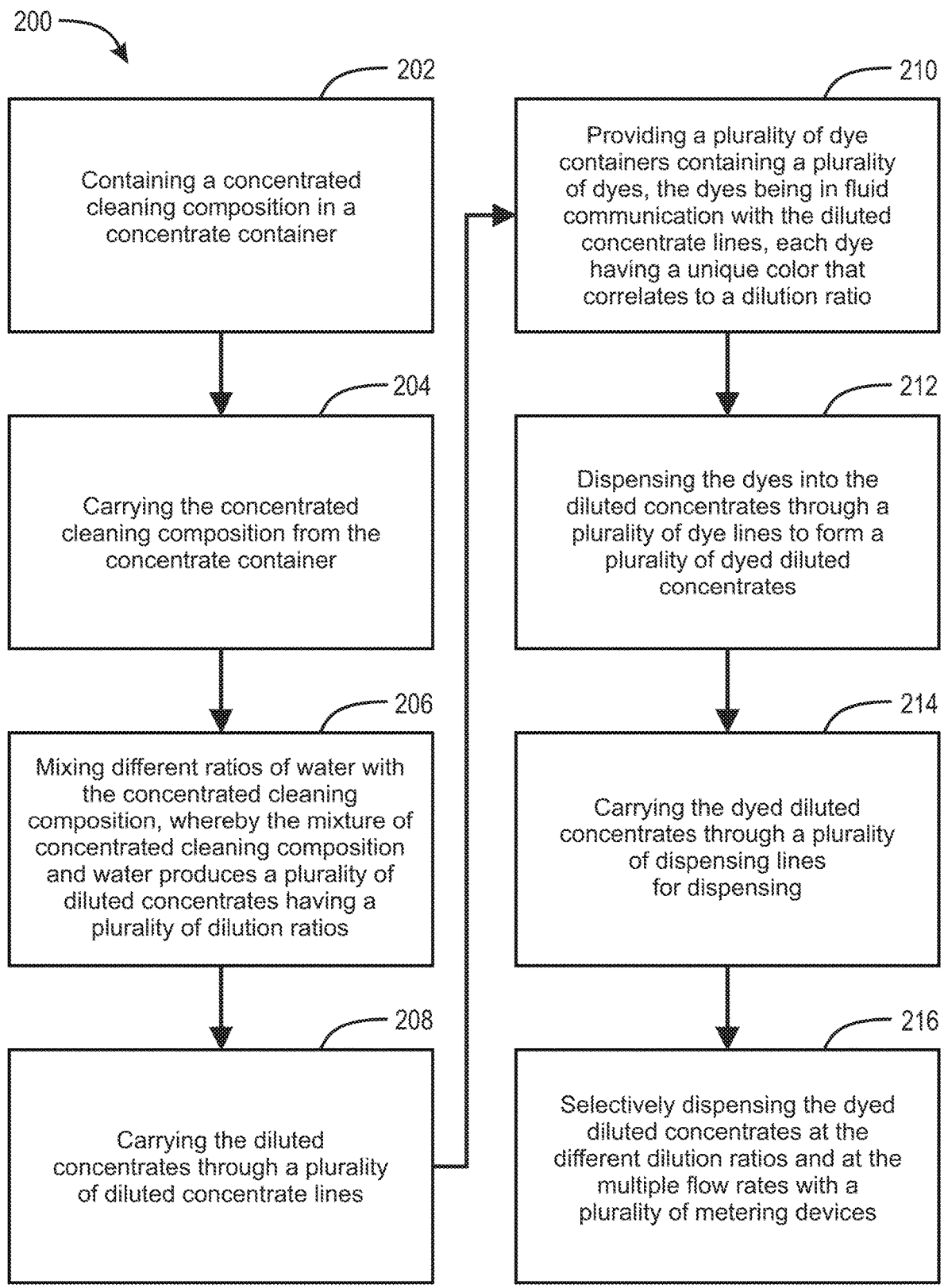
FIG. 7 illustrates a flowchart diagram of an exemplary method for distributing color-coded dilution ratios of cleaning concentrates, in accordance with an embodiment of the present invention.

As illustrated in the flowchart in FIG. 7, a method 200 for distributing color-coded dilution ratios of cleaning concentrates may comprise an initial Step 202 of containing a concentrated cleaning composition in a concentrate container. The concentrate container is completely covered during filling, so that any splashing or splattering of the cleaning chemicals is safely contained. The concentrate container may be collapsible, bladder type packages, or containers which collapse as concentrate is withdrawn therefrom. A Step 204 may further include carrying the concentrated cleaning composition from the concentrate container. A concentrate outlet line 108 carries the concentrated cleaning composition 104 out of the concentrate container 102 for dilution, color-coding, and selective distribution.

In one non-limiting embodiment, a Step 206 comprises mixing different ratios of water with the concentrated cleaning composition, whereby the mixture of concentrated cleaning composition and water produces a plurality of diluted concentrates having a plurality of dilution ratios. Another Step 208 includes carrying the diluted concentrates through a plurality of diluted concentrate lines. Another Step 210 may include providing a plurality of dye containers containing a plurality of dyes, the dyes being in fluid communication with the diluted concentrate lines, each dye having a unique color that correlates to a dilution ratio.

In other embodiments, a Step 212 may include dispensing the up to 4 separate dyes and or up to 4 separate scented dyes and or up to 4 separate scents into the concentrates through a plurality of lines to form a plurality of dyed concentrates. A Step 214 comprises carrying the dyed diluted concentrates through a plurality of dispensing lines for dispensing. In one non-limiting embodiment, a plurality of dispensing lines 120a-b are in fluid communication with the dye lines 118a-d for carrying the dyed concentrate 148a-d to be dispensed. Dispensing lines 120a-b are configured to dispense the concentrated cleaning composition 104 so that a mop bucket or spray bottle can be easily filled without requiring activation of a water supply. Water is introduced into water lines 120c a-b at about @ 40 psi minimum.

A final Step 216 includes selectively dispensing the dyed diluted concentrates at the different dilution ratios and at the multiple flow rates with a plurality of metering devices. Metering devices 122a, 122b are in fluid communication with the dispensing lines 120a, 120b. Metering devices 122a-b selectively dispense the dyed diluted concentrates 148a-d at the different dilution ratios and at the multiple flow rates. Metering devices 122a-b comprise alphanumeric or color-coding identification markings 124a-d that serve as visual indicators for identification and selection of both the dilution ratios and the flow rate of dyed diluted concentrate 148a-d.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A system for distributing color-coded dilution ratios of cleaning concentrate, the system comprising:
    a concentrate container containing a concentrated cleaning composition;
    a concentrate outlet line being in fluid communication with the concentrate container, the concentrate outlet line is split into at least 4 carrying lines to move the concentrated cleaning composition from the concentrate container,
    a pressurized water supply;
    a plurality of at least 4 separate dye containers containing at least 4 separate dyes having at least 4 separate dye outlet lines, each dye having a unique color correlating to a dilution ratio of a diluted concentrate, each dye outlet line being in fluid communication with corresponding one of the at least 4 carrying lines whereby the concentrated cleaning composition is selectively carried through the concentrate outlet line to one of the at least 4 carrying lines to a corresponding one of the at least 4 dye outlet lines;
    a plurality of metering devices in fluid communication with the at least 4 carrying lines, the at least 4 separate dye outlet lines and the pressurized water supply, the metering devices having dilution port points whereby apertures are selectively opened by a valve and a control handle for allowing the pressurized water supply to mix with and aspirate the dye and the concentrated cleaning composition at different dilution ratios and at multiple flow rates;
    a plurality of dispensing lines being in fluid communication with the metering devices, the dispensing lines carrying the mixed dyed diluted concentrates for dispensing ready to use products having the different dilution ratios.

2. The system of claim 1, wherein the concentrated cleaning composition includes at least one of the following: a soap, a detergent, a degreaser, ammonia, calcium hypochlorite, citric acid, sodium hypochlorite, sodium hydroxide, and acetic acid.

3. The system of claim 1, wherein the concentrate container comprises a collapsible bladder package.

4. The system of claim 1, wherein the concentrate container comprises a sidewall forming an interior volume and a container opening regulating access to the interior volume.

5. The system of claim 1, further comprising a plurality of backflow protectors adapted to join the lines.

6. The system of claim 5, wherein the backflow protectors comprise a simple check valve.

7. The system of claim 1, wherein the plurality of up to at least 4 separate dye containers are at least 4 separate scent containers.

8. The system of claim 1, further comprising a line bracket defined by a plurality of holes disposed in a linear, spaced-apart relationship.

9. The system of claim 8, wherein the holes in the line bracket enable passage of the at least 4 carrying lines.

10. The system of claim 1, wherein the metering devices comprise alphanumeric or color-coding identification markings.

11. The system of claim 10, wherein the identification markings form a visual indicator the dilution ratios of the dyed diluted ready to use products.

12. The system of claim 1, wherein the flow rates comprise a high flow rate and a low flow rate.

13. The system of claim 1, further comprising a housing, the housing receiving and segregating the concentrate container and the dye containers.

14. A method for distributing color-coded dilution ratios of cleaning concentrates, the method comprising:
    containing a concentrated cleaning composition in a concentrate container;

providing a concentrate outlet line that splits into at least 4 carrying lines being in fluid communication with the concentrated cleaning composition from the concentrate container;

supplying a pressurized water inlet line;

containing at least 4 separate dyes having at least 4 separate dye outlet lines in at least 4 separate dye containers;

the at least 4 dye outlet lines being in fluid communication with a corresponding one of the at least 4 carrying lines, each dye having a unique color that correlates to a dilution ratio;

allowing the pressurized water supply to mix with and aspirate the dye and the concentrated cleaning composition at different dilution ratios and at multiple flow rates through a plurality of metering devices in fluid communication with the at least 4 carrying lines, the at least 4 separate dye outlet lines and the pressurized water supply; and dispensing ready to use products having the different dilution ratios through one of a plurality of dispensing lines being in fluid communication with the metering devices.

\* \* \* \* \*